United States Patent
Selby

(10) Patent No.: US 8,064,463 B1
(45) Date of Patent: Nov. 22, 2011

(54) METHOD AND SYSTEM FOR ALLOCATING RESOURCES WITHIN A DATA COMMUNICATIONS NETWORK

(76) Inventor: Scott Andrew Selby, Laguna Niguel, CA (US)

( * ) Notice: Subject to any disclaimer, the term of this patent is extended or adjusted under 35 U.S.C. 154(b) by 969 days.

(21) Appl. No.: 12/017,086

(22) Filed: Jan. 21, 2008

(51) Int. Cl.
*H04L 12/56* (2006.01)
(52) U.S. Cl. .................................... 370/395.41
(58) Field of Classification Search .......... 370/229–237, 370/252–253, 335–338, 342–345, 395.21–395.43; 455/450–454, 463–464
See application file for complete search history.

(56) References Cited

U.S. PATENT DOCUMENTS

| | | | |
|---|---|---|---|
| 5,682,379 A | 10/1997 | Mahany et al. | |
| 5,912,921 A | 6/1999 | Warren et al. | |
| 6,757,269 B2 | 6/2004 | Dorenbosch et al. | |
| 7,039,027 B2 | 5/2006 | Bridgelall | |
| 7,110,380 B2 | 9/2006 | Shvodian | |
| 7,792,040 B2 * | 9/2010 | Nair et al. | 370/238 |
| 2005/0047382 A1 | 3/2005 | Park et al. | |
| 2006/0146807 A1 | 7/2006 | Codaccioni et al. | |
| 2007/0058535 A1 | 3/2007 | Bichot et al. | |
| 2008/0259852 A1 * | 10/2008 | Massiera et al. | 370/329 |
| 2009/0116439 A1 * | 5/2009 | Madan et al. | 370/329 |
| 2009/0180430 A1 * | 7/2009 | Fadell | 370/329 |

* cited by examiner

*Primary Examiner* — Thai Hoang

(57) ABSTRACT

A method and system for allocating resources within a data communications network. A bandwidth manager regulates attached devices access to shared bandwidth. The manager ensures that a user has a predetermined amount of bandwidth available or a set speed of data transfer; other users access to shared bandwidth may be restricted as needed to achieve this goal. These other users still have a predetermined minimum amount of access. And so the present invention allows a plurality of users to divide up their use of a shared data communications network in a predetermined manner that ensures the access to this shared resource in a customized way that works best for them.

10 Claims, 7 Drawing Sheets

METHOD AND SYSTEM FOR ALLOCATING RESOURCES WITHIN A DATA COMMUNICATIONS NETWORK

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

The present invention relates generally to a method for configuring a data communications network, including, but not limited to, a local area network (LAN) or wireless local area network (WLAN). More particularly, the present invention relates to a method and system for allocating bandwidth resources in a data communications network.

2. Prior Art

A data communications network is a computer network used for communication among computer devices, often connecting a given attached device to an Intranet and/or the Internet. Various kinds of such networks exist.

One kind of data communications network is a local area network (LAN). LANs allow organizations to share information over a high speed network that may be assembled with relatively inexpensive hardware components. It used to be that LANs were limited to hardwired infrastructure, requiring the user to physically connect to the LAN via a wired connection. However, with the growth of wireless telephony and wireless messaging, wireless communications have also been applied to the realm of LANs, resulting in the development of wireless local area networks (WLANs).

A WLAN is defined as "a communication system that transmits and receives data using modulated electromagnetic waves, implemented as an extension to, or as an alternative for, a wired LAN. WLANs are typically found within a small client node-dense locale (e.g. a campus or office building), or anywhere a traditional network cannot be deployed for logistical reasons. Benefits include user mobility in the coverage area, speed and simplicity of physical setup, and scalability." [From *The Free On-line Dictionary of Computing*]. Another definition is "a local area network that uses high frequency radio signals to transmit and receive data over distances of a few hundred feet; uses Ethernet protocol." [From *WordNet* 3.0].

Sometimes "wifi" is used as a synonym for WLAN although it is properly considered a trademark for the certification of products that meet certain standards for transmitting data over wireless networks.

Mobile communication technology is currently being developed to provide multimedia service by maximizing data rate and frequency use efficiency. A primary example of such technology is a mobile access network. The mobile access network is a generic name for a network that provides high-speed wireless services to terminals within specific service coverage.

Mobile access networks can be separated into Wireless Personal Area Network (WPAN), WLAN, and a Wireless Metropolitan Area Network (WMAN) according to the sizes of their service coverage areas.

For example, in a WPAN or a WLAN multiple devices communicate with one another while sharing the bandwidth allocated to the network. Because multiple devices are sharing the same bandwidth, it is necessary to coordinate the use of that bandwidth. A media access control (MAC) protocol defines how that bandwidth is to be shared among the devices of the WPAN or WLAN.

It is also known to use a plurality of spread spectrum radio transmitter/receivers ("transceivers") that are coupled together in a WLAN. A central host processing unit (i.e., a "network master" or "base station") sends information to and receives information from any one of the plurality of remotely disposed client transceiver nodes (also known as attached or peripheral devices). In such a WLAN, the remote client transceivers may comprise portable units that operate within a defined environment to report information back to the network master. Each of the remote client transceivers communicate with the network master using the same RF carrier frequency and digital code sequence. It should be apparent that such WLAN systems offer increased flexibility over hard-wired systems by enabling operators of the remote transceivers substantial freedom of movement through the environment.

U.S. Pat. No. 5,682,379 discloses a transceiver apparatus for creating a wireless personal local area network between a computer terminal and one or more peripheral devices. A separate transceiver is connected to the computer terminal and to each peripheral device. The transceivers can be connected to the terminal or peripheral device either internally or externally. A low power radio is used to communicate information between the computer terminal and peripheral devices. Different transceivers can be used for modifying the carrier frequency and power of the local area network. The microprocessor is located inside each transceiver and controls the information flow of the transceiver including the communication protocol which allows each device to know if other devices are communicating, which devices are being communicated to, and selectively address the peripheral devices.

A WLAN is configured with an Access Point (AP) installed at an end point of a wired network or with a plurality of terminals. The WLAN offers high-speed wireless communications to terminals within its service coverage. It works around hotspots such as those available in households, schools, hotels and conference centers.

It is expected that the development of the mobile access networks will gradually increase dependency on wireless communications. In addition, the proliferation of terminals capable of accessing the mobile access networks such as laptops, Personal Computers (PCs), Personal Digital Assistants (PDAs), driven by their small size, light weight and low price, has increased demands for multimedia services in a mobile environment, particularly in hotspot zones.

Problems arise when multiple users share a single WLAN or other network computing environment. For purposes of illustration, this discussion shall focus on embodiments of the present invention within the context of a WLAN. For instance, in the context of a home WLAN, multiple users each with one or more attached devices may be trying to make use of the WLAN at the same time. If one or more of the users is engaged in a computing activity that consumes a large amount of the shared bandwidth, such as, for example, downloading large files such as movies, videos, or songs, this often drastically limits the other users access to the resources of the shared WLAN.

For example, User One could be the owner of a large apartment with two roommates, Users Two and Three. User One has a notebook computer that he sometimes connects wirelessly to the shared WLAN and sometimes uses a direct wired connection. The other two users solely access the WLAN wirelessly. One day, User One needs to use access the wireless network via his computer in order to e-mail his publisher some large image files necessary for the printing of his upcoming book. He needs to achieve this promptly. When said user tries to upload his image files, he finds the network is very slow and the upload rate on his files is very low. Said user then tries to plug in his notebook computer directly into the network making it a wired device but he still has the same problem.

User One controls the WLAN as the owner of the apartment and account holder with the Internet Service Provider. Using the password given to him by the ISP, he had previously secured their shared network by creating a password that users must have to access said WLAN. As said user had properly set up the WLAN to require the use of said password he knew that the problem was not that additional users were freeloading and making use of their network. His two roommates did have the password and were at that moment on the network. When User One asked Users Two and Three what they were up to, it turns out that Two was downloading movies using the peer-to-peer file-sharing program BitTorrent and Three was downloading a trial version of a large software program. User One had to ask both his roommates to stop their activities in order to reduce their bandwidth consumption and allow him to upload his image files quickly.

This problem could have been worse if User Two and/or User Three were not available to change their activities, for instance if one or both of them were out of the house at the time and had locked their doors. With the BitTorrent example, User One could ask his roommates to turn on the scheduler option on the program so that it only used large amounts of bandwidth at certain hours at which it is thought to be unlikely to pose a problem such as one to five in the morning, but perhaps it turns out that is exactly when User One needs to access the network in this example.

In such a situation, the only option available to User One under prior art is to cut off the others from the shared network. The simplest way of doing so is for User One to physically remove the cable connecting the cable modem from the wireless router and plus his own computer directly into the network. The WLAN with three attached devices in this example has now been transformed into a LAN with one attached device.

The other users then have no access to the network and User One needs to remember to plug back in the cable to the wireless router when he is done. In this example, our User One is an absent minded professor who often forgets to do this leaving his roommates without access to the network. When User One does remember to plug it back in, he may need to reboot the router and his roommates may need to reboot their computers in order to be able to access the network. At the very least, the other users will have been deprived of access to the network during the time User One monopolized it.

Similar such problems could emerge wherever multiple devices access a shared data communications network: in an office, home, café, business, public hot spot or any other number of locations. Such problems are likely to get worse in the future as users come to routinely access larger amounts of data such as movies. Accordingly, there exists a pressing need for a better way to allocate resources such as bandwidth in a data communications network.

BRIEF SUMMARY OF THE INVENTION

Accordingly, to resolve the above shortcomings, an embodiment of the present invention provides a method and system by which the primary user of a data communications network, such as a WLAN, can regulate the bandwidth consumption of the various users of said network, and thus the speed at which said users can access the network.

The "primary user" in this discussion means the user with the authority to change the settings on the bandwidth manager described herein. Said user generally would be the user who is authorized to set up the network in question. For instance, in a residential situation, that would likely be the user who has the authority to set up the password feature on the network account and may be the user whose name is on the account with the Internet Service Provider (ISP). It may not though. It is also possible to have an embodiment of the present invention that does require a primary user but could have all the users be equal or more than one primary user or any hierarchy selected by whomever controls the account.

In the above example of a home data communications network with both wireless and wired elements and three users wherein the primary user has an urgent need to upload large image files while his two roommates are engaged in downloading and uploading activities that have drastically slowed the speed at which the primary user can access the shared network, an embodiment of the present invention could solve that problem.

For instance, the primary user (here "User One") could turn on the bandwidth manger described in the present application allowing him to limit his roommates access to the shared bandwidth of the network such that his own access will be fast enough to conduct his desired uploading at the speed of his choice. Meanwhile, his roommates will not be entirely cut off from the network resources, but will instead find their activities limited the extent necessary to maintain a fast speed for the primary user while allowing them sufficient access to carry out a minimum number of activities that require less bandwidth. Thus, for example, the additional users can still check their email or read the news online or just continue their BitTorrent use and downloading of a large program file respectively but at a much reduced rate. Once the primary user's tasks were completed, the bandwidth manager would automatically free up those resources for the use of other users such as Users Two and Three here.

Once on, an embodiment of the bandwidth manager described herein could employ a variety of mechanisms for checking the speed available to the primary user or a set hierarchy of users or the users as a collective whole. It's easier to describe an embodiment of the invention in terms of a primary user and a number of secondary users, but as the noted elsewhere in this application other configurations are possible.

Such mechanisms for checking the speed available to users, include, but are not limited to the use of a beacon, a carrier-sensing scheme, or other methods of measuring how much bandwidth a given user is consuming at any given time, how much total bandwidth is available, and how such usage has impacted the speed at which the primary user could access the network.

The bandwidth manager can be set with a plurality of options, some, but not all, of which are described in detail in the drawings below.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a logic flow diagram of an embodiment of the present invention when the bandwidth usage manager is on.

DETAILED DESCRIPTION OF THE PREFERRED EMBODIMENTS

The present invention relates to systems and methods for wireless network communications and, more particularly, to the allocating of bandwidth resources within such networks.

Figure 1:
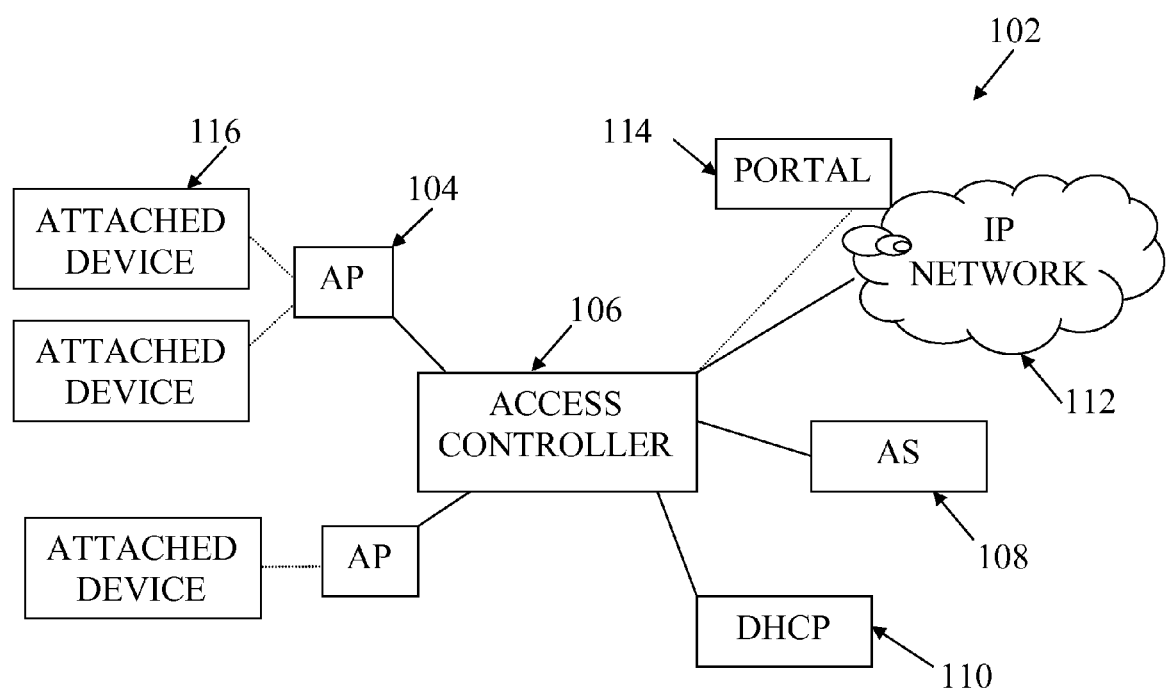
FIG. 1 is a schematic diagram illustrating a typical network structure of a wireless local area network (WLAN).

FIG. 1 is a schematic diagram illustrating a typical network structure of a WLAN. As shown in this figure, a WLAN is generally composed of an Access Point (AP) 104, an Access Controller (AC) 106, an Authenticating, authorization and accounting Sever (AS) 108 and a Dynamic Host Configuration Protocol (DHCP) device 110. The AC not only connects all of APs, AS and DHCP, but also connects with an Internet Protocol (IP) network 112 through a Portal Server 114 simultaneously. Attached Devices are connected to APs in wireless mode, and accessed to the data network such as Internet through the AC which controls the users' access. Said Attached Devices 116, can be referred to as user equipments, nodes or peripherals. Usually being the access part of a WLAN, an AC and an AP can be either independent devices or synthesized in one single device. As described to this point, this figure represents the prior art for a typical WLAN. What is new is the regulating of bandwidth within this network as described below.

Figure 2:
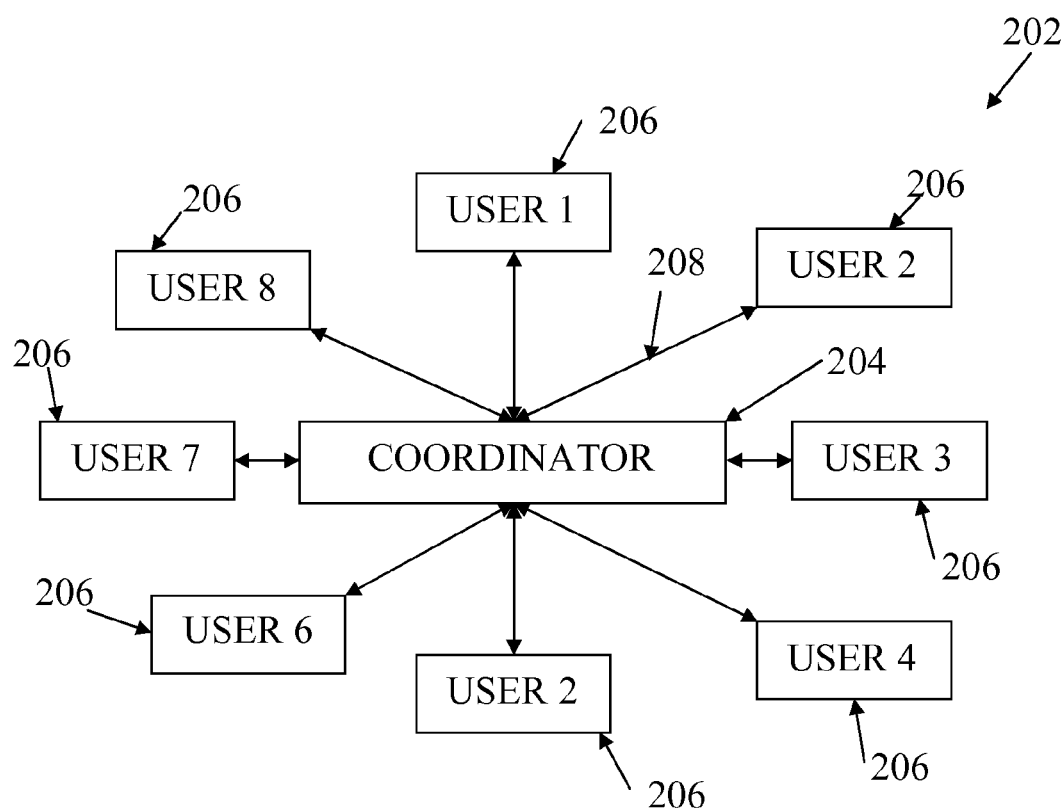
FIG. 2 is a block diagram of a wireless local area network (WLAN) with multiple users.

FIG. 2 is a block diagram of a wireless local area network (WLAN) with multiple users. Said WLAN 202 includes a coordinator 204, and a plurality of users (which can also be described as nodes or attached devices) 206, each of which is connected to the coordinator 204 via a wireless link 208. Each user of the WLAN may be a different wireless device or computer set up to include wireless accessibility.

Typically, a WLAN is confined to within a house, an office, a floor of a building, etc. Each of the users 206 shares the same bandwidth. Accordingly, the coordinator 204 coordinates the sharing of that bandwidth. Prior art includes standards that have been developed to establish protocols for sharing bandwidth in a wireless network setting. For example, the IEEE standard 802.15.3 provides a specification for the media access control (MAC) and physical layers (PHY). The MAC protocol defines frames through which the sharing of the bandwidth by the users 206 is managed by the coordinator 204 and/or the users 206. Here, the coordinator 204 would include the method of managing shared bandwidth described below.

Figure 3:
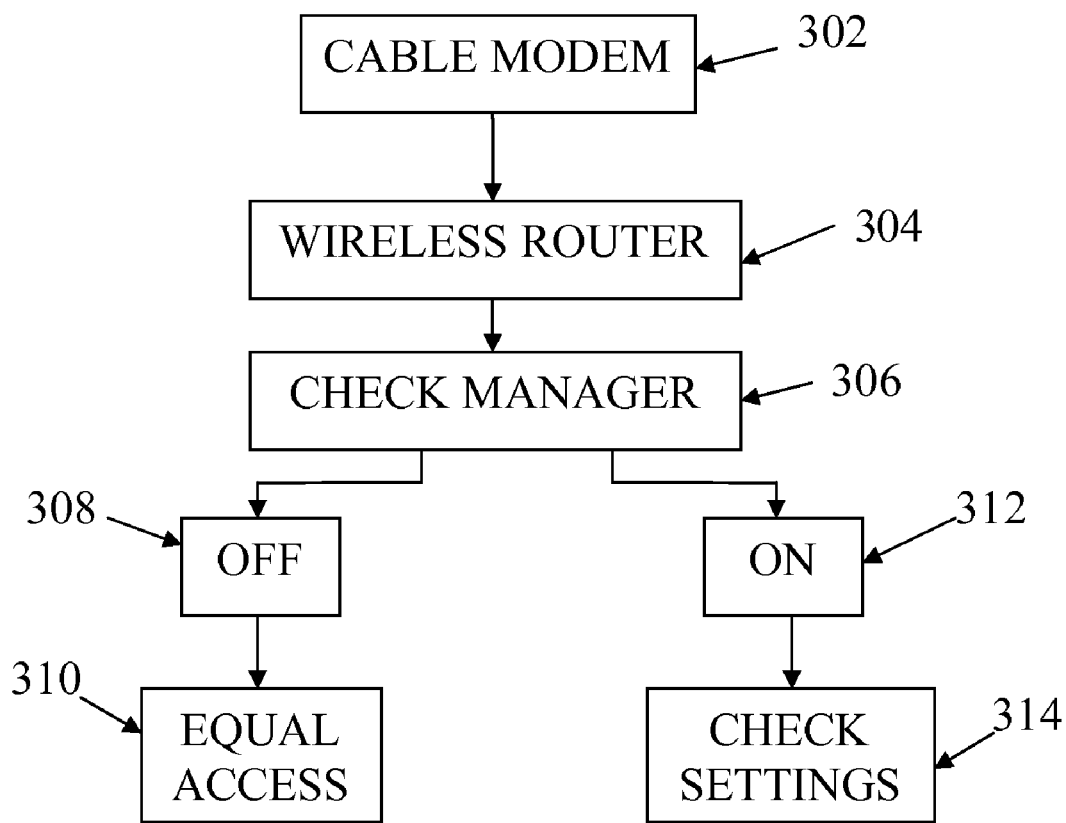
FIG. 3 is a flow diagram illustrating a logical flow of an embodiment of the present invention when it is determining whether the bandwidth usage manager is on and its setting.

FIG. 3 is a flow diagram illustrating a logical flow of an embodiment of the present invention when it is determining whether the bandwidth usage manager is on and said manager's setting if it is on. In this embodiment, Internet Access first flows through a cable modem 302, but it could just as easily come from another source such as, but not limited to, dial-up access, Ethernet, or DSL. Next data communications flow through a wireless router 304 which in step 306 checks the bandwidth usage manager. If said manager is off, at step 308 the system grants all users (also known as nodes or attached devices or peripheral devices) equal access to the WLAN's bandwidth at step 310. If said system recognizes that said manager is on at step 312, it then checks said manager's settings at step 314 to see how bandwidth usage should be regulated amongst a plurality of users.

Figure 4:
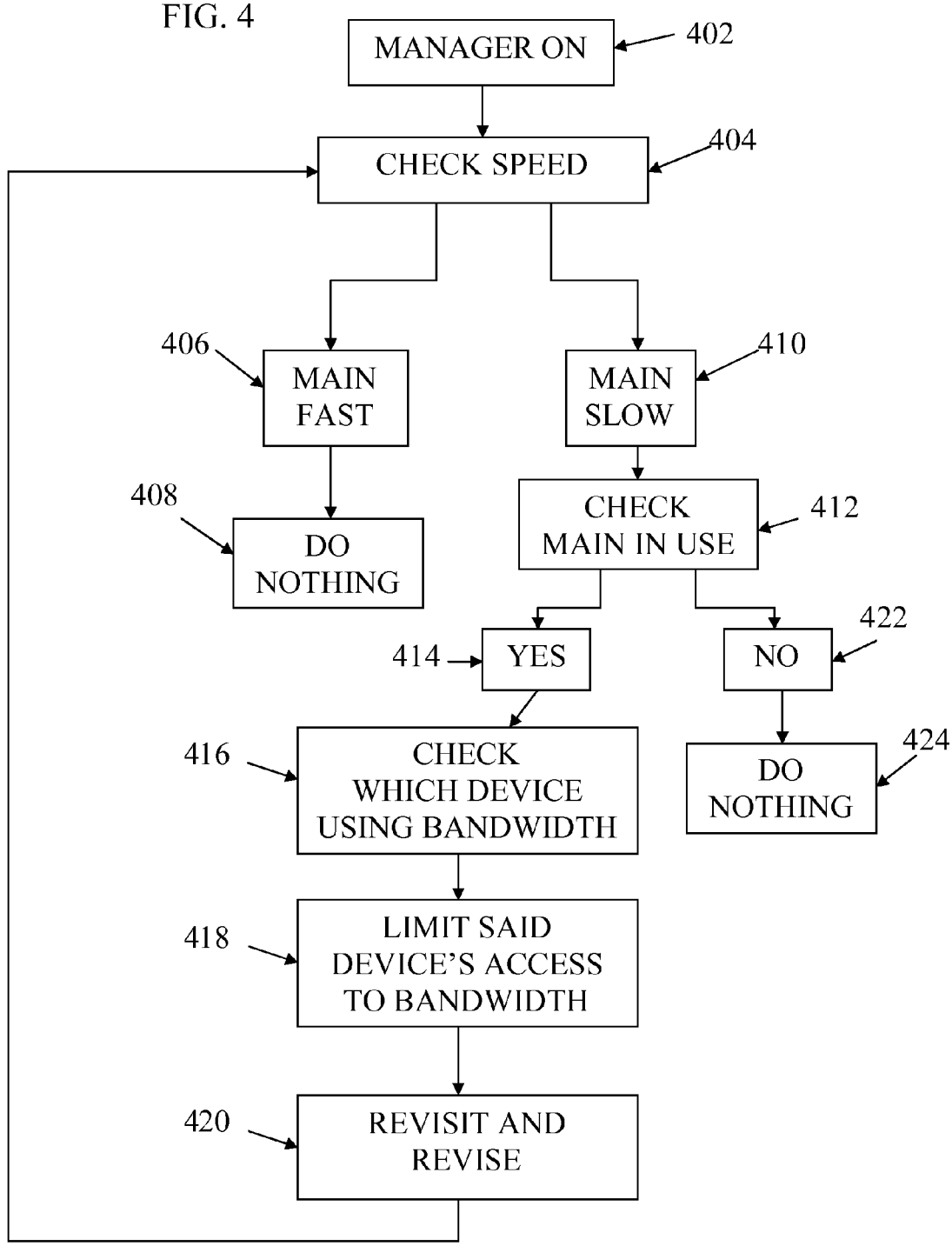

FIG. 4 illustrates a logic flow diagram of an embodiment of the present invention when the bandwidth usage manager is on. At step 402, the bandwidth usage manager is on, at step 404 it checks the speed of the various connections to the data communications network. There are a variety of methods for doing this, such as, but not limited to beacons, carrier-sensing schemes, and/or monitoring the consumption of bandwidth by each attached device. In this embodiment, the manager is solely concerned with the bandwidth available to the main or primary device attached to it. Other embodiments could be concerned with the speed available to all users or other combinations of users in various hierarchies or equally. If the system determines at step 406 that the main device has sufficient bandwidth available to be considered fast according to predetermined parameters, then at step 408 it would do nothing until the next interval at which it is set to check the available bandwidth. If the system determines at step 410 that the bandwidth available to the main device is limited enough to be considered slow, then at step 412 it would check if the main device is in fact currently using the shared network. If said device is not in use within the network as shown at step 422, then there is no need for the system to manage the wireless bandwidth usage as shown at step 424. If said main device is in use, at step 414, the system would then check at step 416 which attached device or devices is/are responsible for using enough bandwidth to slow down the main device's access. At step 418, the system would then limit the bandwidth the device or devices that it calculates are responsible for the bandwidth access problems faced by the main device. Such a limit could have a preset figure such that only a small amount of bandwidth would be used, but it would be sufficient for most non-bandwidth intensive wireless activities such as checking e-mail. At step 420, the system could periodically revisit and revise this situation by repeatedly going through steps 404 and on again until it becomes possible to increase the amount of bandwidth available to the attached devices.

Figure 5:
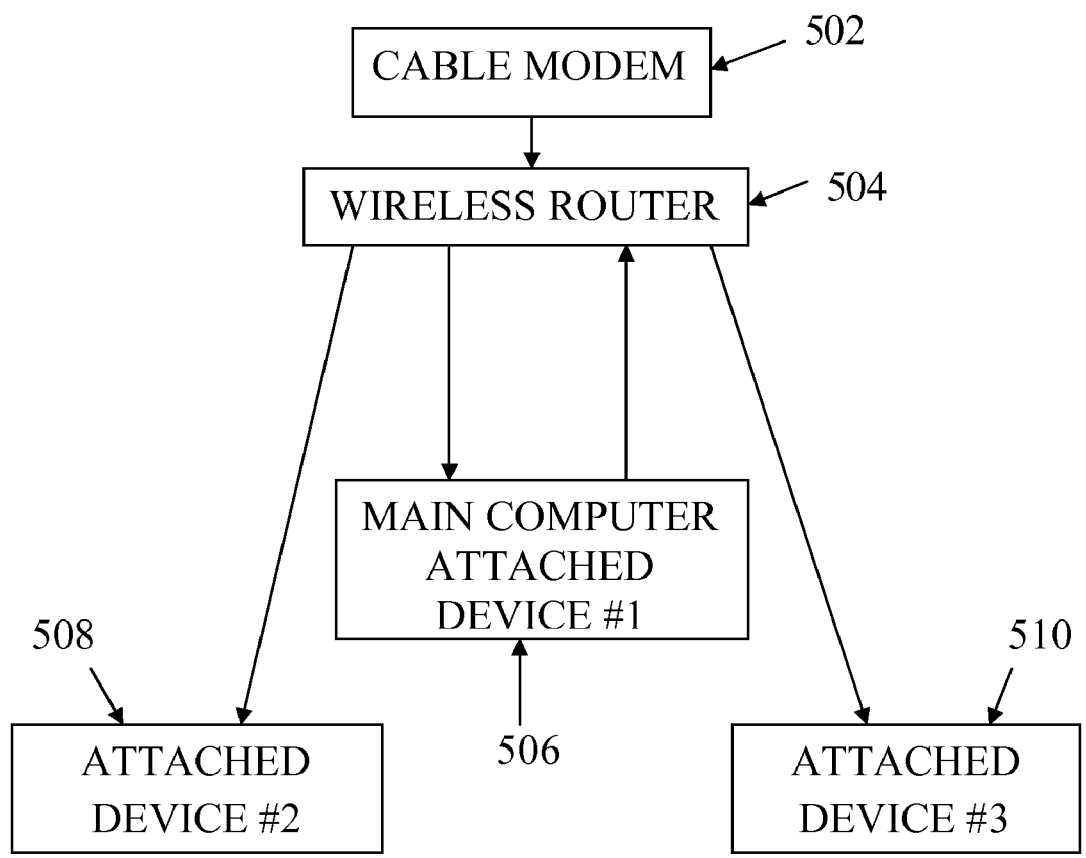
FIG. 5 illustrates an example of a main computer and two additional attached devices using an embodiment of the present invention.

FIG. 5 illustrates an example of a main computer and two additional attached devices using an embodiment of the present invention. At 502, there is a cable modem, although again it could be any device for accessing an Intranet and/or Internet such as, but not limited to DSL, dial up or Ethernet. At 504, there is a wireless router which communicates wirelessly with the main computer, attached device #1, at 506 as well as two additional attached devices, attached device #2 at 508 and attached device #3 at 510. To further illustrate, one example of this figure in practice could consist of three roommates sharing a single WLAN. The roommate with the main computer 506 wants to ensure that he is also able to access the internet at a decent speed even though his two roommates with their computers at 508 and 510 respectively use up a huge amount of bandwidth by downloading large files such as video and music while he is trying to get serious work done. As such, said user of the main computer could set up the bandwidth manager to limit his roommates access to the shared bandwidth of the WLAN when it disrupts his own ability to use the WLAN at a predetermined speed.

Figure 6:
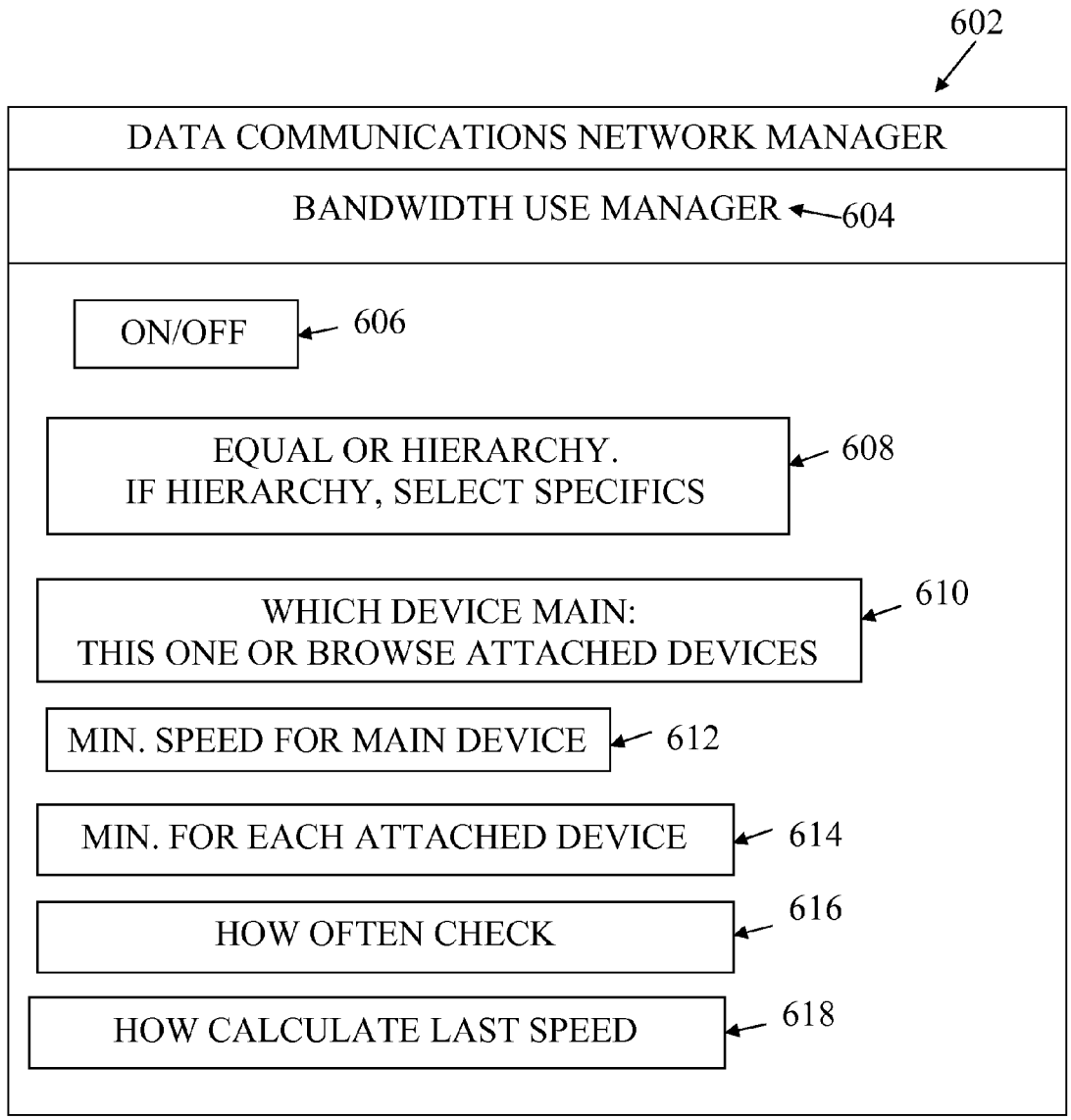
FIG. 6 illustrates an example of a sample bandwidth usage manager with a variety of options available to the user.

FIG. 6 illustrates an example of a sample bandwidth usage manager 602 with a variety of options available to the user. 604 is an interface for a user to control various options related to an embodiment of the present invention in the form of a bandwidth usage manger. The first option 606 would be for the user to select whether the bandwidth manager is on or off. For example, if the user of the main attached device is not working on anything more important than the work of those on other attached devices, he or she could turn off the bandwidth manager until such a time as he or she does have a higher need of access to a specified speed, amount, or percentage of bandwidth. Once said manager is on, there are a number of other options available to the user, some of which are shown in this figure. At 608, the user can set whether each attached device is equal in its allowed access to bandwidth or if a hierarchy should be set up. If there is a hierarchy, the user needs to select how each device fits within such a hierarchy and the overall nature of the hierarchy, for example, a singular main device that is highest with the rest equal or a highest, second highest, etc. A system with equal access to bandwidth using the manager could be set up so that if any device uses more than its proportionate share of the bandwidth available based on the number of devices actively using the data communications network, then its usage is regulated to its proportional share such that other users are not unduly slowed down in their access to network resources. For a setup with a hierarchy, at step 610 the user needs to select which device is the main or primary device and, if other devices are to have a hierarchical relation with one another, their order of importance.

At step 612, the user can select the minimum speed for the main device (and for other hierarchical attached devices) such that when the main device's communication speed within the network falls below that number, the manager then limits other devices access to the network such that enough bandwidth is freed up to speed up the main device's access. Various measurements of speed, time periods to check these measurements and methods of checking these measures exist and will continue to be developed that could be used here. At step 614, the user can set up the minimum speed for all attached devices such that the bandwidth manager, when it cuts back on lower priority attached devices allows them sufficient access to the network to perform certain basic low impact tasks such as checking e-mail or doing instant messaging.

At step 616, the user sets up how often the manager should check the bandwidth availability, potential speed, and needs of the high priority devices. The same or a separate setting option could cover how often the manager rechecks to see if it should again allow additional bandwidth access to lower priority attached devices. At 618, the user can specify how the bandwidth manager determines the most recent bandwidth demands or speed of the main or other high priority devices. For instance, it could use an average spread over a specified amount of time or simply use the figure from the most recent time it checked.

Figure 7:
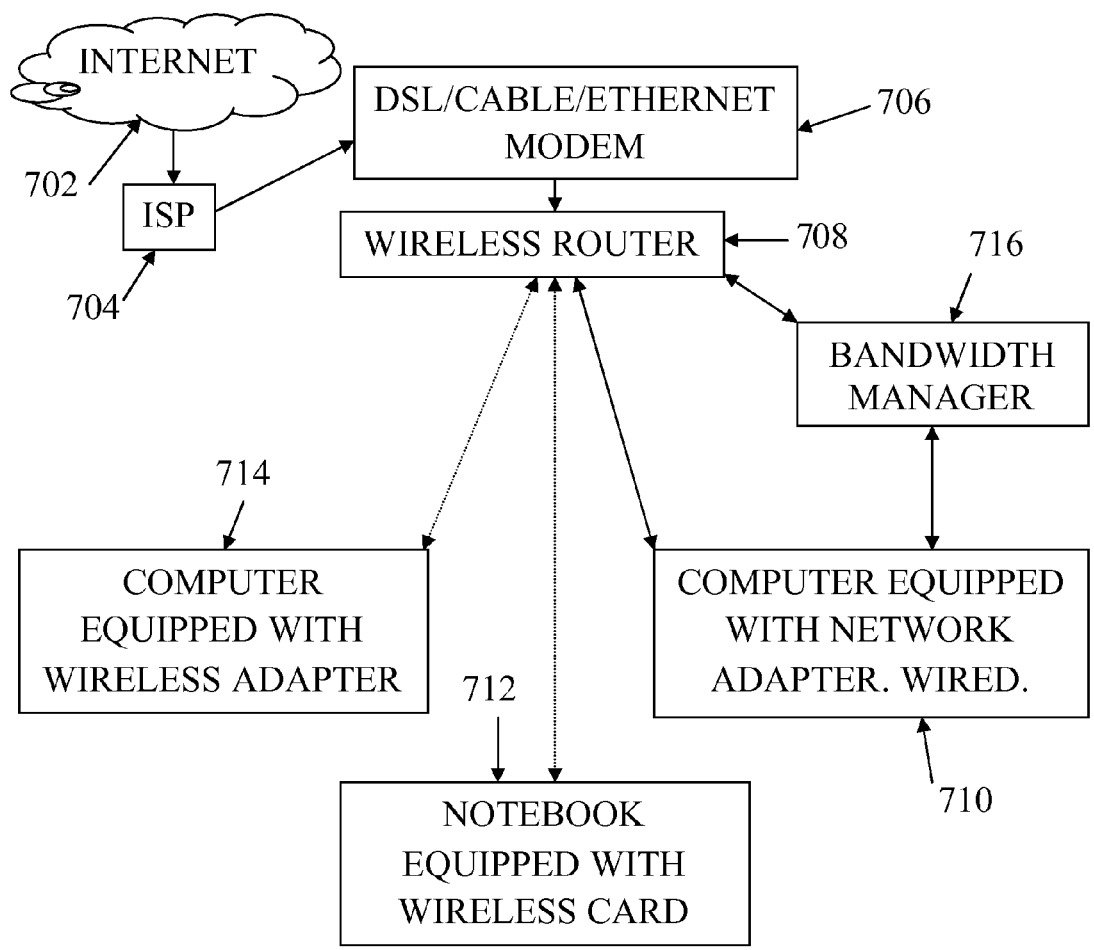
FIG. 7 is a schematic diagram illustrating a typical network structure of a mixed wired and wireless LAN.

FIG. 7 is a schematic diagram illustrating a typical network structure of a mixed wired and wireless LAN. 702 is the Internet (it could also be or include an Intranet) which connects to 704, an Internet Service Provider (ISP). The ISP then connects to 706, which is the DSL or cable or Ethernet (or whatever other technology connects a modem to an ISP such as dial up or technologies yet to be developed). This connects in turn to a wireless router 708. Said router 708 connects in this example of an embodiment of the present invention with 710, a computer equipped with a network adapter and connected via a wire such as a USB connection. Said router 708 also has two additional attached devices 712 and 714, these though are connected wirelessly. 712 is a notebook (also known as a laptop) computer equipped with a wireless card while 714 is a desktop computer equipped with a wireless adapter. In the present figure, the attached device at 710 belongs to the primary user who uses it to access the bandwidth manager 716 which in turn regulates the wireless router 708 in its communications with all three attached devices (710, 712, 714) as described elsewhere in this application.

An embodiment of the present invention could include the use of passwords to automatically determine the place in a predetermined hierarchy of a given attached device. Such an embodiment could make use of the password based security system already present on all secure data communications networks that require a user to login to the system using a password. In one embodiment of the present invention, there could be more than one password that grants access to a data communications network such that use of a given password determines the hierarchical status of the associated attached device in terms of its access to bandwidth in accordance with the present invention.

For example, a WLAN in a café could have one password for the café's staff use giving their computers preferred access to the network's bandwidth as compared to the patrons of the café who are given a lower level password with which to access the shared network. Said lower access password then results in customer's computers (attached devices) having a lower priority in the predetermined hierarchy. So, for example, in one embodiment of the present invention, the workers at a café could still have fast access to the Internet via the WLAN at a time when the customers access is relatively slow.

Although the present invention has been described primarily with reference to a wireless local area network, ones skilled in the art will recognize that the present invention may be applied to other settings where bandwidth is to be shared among a plurality of users. For example, the present invention would be equally applicable to a peer-to-peer network, dual-mode ultra wideband (UWB), a wireless wide area network (WWAN), a universal mobile telecommunication system (UMTS), a Wireless Metropolitan Area Network (WMAN), a wired LAN, a mixed wired and wireless LAN, a virtual private network (VPN), a wireless personal area network (WPAN), a personal area network (PAN), a Campus Area Network (CAN), a Metropolitan Area Network (MAN), a Global Area Network (GAN) and other data communication networks. Also, communicating with a data communications network could be done by devices other than computers, such as a Bluetooth interface, cell phone, digital camera, printers, etc.

Those skilled in the art will appreciate that the invention may be practiced in network computing environments with many types of computer system configurations, including personal computers, hand-held devices, multi-processor systems, microprocessor based or programmable consumer electronics, network PCs, minicomputers, cell phones, mainframe computers, and the like. The invention may also be practiced in distributed computing environments where tasks are performed by local and remote processing devices that are linked through a communications network. In a distributed computing environment, program modules may be located in both local and remote memory storage devices.

The description of the present embodiment has been presented for purposes of illustration and description, but is not intended to be exhaustive or limited to the invention in the form disclosed. Many modifications and variations will be apparent to those of ordinary skill in the art. The present invention may be embodied in other specific forms without departing from its spirit or essential characteristics.

The embodiment was chosen and described in order to best explain the principles of the invention, the practical application, and to enable others of ordinary skill in the art to understand the invention for various embodiments with various modifications as are suited to the particular use contemplated. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allocating resources in a data communications network, compromising:
   determining the amount of bandwidth available to a given user; and adjusting and readjusting the bandwidth available to a user in accordance with predetermined parameters;
   wherein a user has a plurality; options including:
   setting whether each attached device is equal in its allowed access to bandwidth or if a hierarchy should be set up;
   for a setup with a hierarchy among attached devices, the user selects one of the attached devices to be a primary attached device and, if other attached devices are to have a hierarchical relation with one another, their relative order of importance;
   selecting a minimum speed or access to bandwidth for the primary attached device (and for other hierarchical attached devices) such that when the primary attached device's communication speed within the data communications network falls below that number, a bandwidth manager then limits other attached devices access to the data communications network such that enough bandwidth is freed up to speed up the primary attached device's access to the data communications network;
   the user can select a minimum speed for all attached devices such that the bandwidth manager, when it cuts back on lower priority attached devices allows them a predetermined amount of access to the data communications network;
   the user sets up how often the bandwidth manager should check the bandwidth availability, potential speed, and needs of high priority device; the user also can determine how often the bandwidth manager rechecks to see if it should again allow additional bandwidth access to lower priority attached devices; and
   the user can specify how the bandwidth manager determines the most recent bandwidth demands or speed of the primary attached device or other high priority devices.

2. A method for allocating resources in a data communications network, compromising:
   determining the amount of bandwidth available to a given user; and adjusting and readjusting the bandwidth available to a user in accordance with predetermined parameters wherein said parameters are set by a user selecting among one or more options; and
   prompting a user to select among one or more of said predetermined parameters when setting up a data communications network.

3. The method of claim 2, wherein determining the amount of bandwidth available to a given user takes into consideration which login name and/or password a user employs to access the data communications network if the data communications network has more than one login name and/or password that allows access to the data communications network and such login names and/or passwords have different priority access to available bandwidth.

4. The method of claim 2, wherein for a setup with a hierarchy of allowed access to bandwidth for attached devices, the user selects which device is a primary attached device and if other attached devices are to have a hierarchical relation with one another, their order of importance.

5. The method of claim 2, wherein a user can select a minimum speed or access to bandwidth for a primary attached device (and for other hierarchical attached devices) such that when the primary attached device's communication speed within the data communications network falls below that minimum speed or access to bandwidth, other attached devices access to the data communications network is limited such that enough bandwidth is freed up to speed up the primary attached device's access to the data communications network.

6. The method of claim 2, wherein the user can select a minimum speed for all attached devices such that when cutting back on lower priority attached devices access to the data communications network, said lower priority attached devices are allowed a predetermined amount of access to the data communications network.

7. The method of claim 2, wherein a user needs to use the administrative account access information for the data communications network in order to be able to select among the options for setting the predetermined parameters.

8. The method of claim 2, wherein the method further includes the step of:
   determining if the bandwidth available to a primary attached device is limited enough to be considered slow, if it is, then checking if the primary attached device is in fact currently using the data communications network; if said primary attached device is not in use within the data communications network, then the bandwidth available to various users of the data communications network would be left alone; if said primary attached device is in use, checking which attached device or devices is/are responsible for using enough bandwidth to slow down the primary attached device's access to the data communications network; and limiting the bandwidth available to an attached device or attached devices responsible for using enough bandwidth to slow down the primary attached device's access to the data communications network.

9. The method of claim 8, wherein the method further includes the step of:

Providing a preset amount of bandwidth to the attached device or attached devices responsible for using enough bandwidth to slow down the primary attached device's access to the data communications network such that only a small amount of bandwidth would be used by this non-primary attached device or non-primary attached devices, but it would be sufficient for non-bandwidth intensive activities.

10. The method of claim 2, wherein the needs of a primary user are expressed by the options the primary user selects regarding how bandwidth is to be shared between users of the data communications network.

* * * * *